US012761053B2

(12) United States Patent
Bjartmarz et al.

(10) Patent No.: US 12,761,053 B2
(45) Date of Patent: Oct. 13, 2026

(54) WIRELESS LOGGER DEVICE AND A METHOD OF IMPROVING HEAT TRANSFER FROM SUCH A LOGGER DEVICE

(71) Applicant: CONTROLANT HF., Kopavogur (IS)

(72) Inventors: Agnar Thor Bjartmarz, Reykjavik (IS); Petur Gordon Hermansson, Gardabaer (IS)

(73) Assignee: CONTROLANT HF., Kopavogur (IS)

( * ) Notice: Subject to any disclaimer, the term of this patent is extended or adjusted under 35 U.S.C. 154(b) by 309 days.

(21) Appl. No.: 18/712,805

(22) PCT Filed: Dec. 7, 2022

(86) PCT No.: PCT/EP2022/084736
§ 371 (c)(1),
(2) Date: May 23, 2024

(87) PCT Pub. No.: WO2023/104858
PCT Pub. Date: Jun. 15, 2023

(65) Prior Publication Data

US 2025/0020493 A1 Jan. 16, 2025

(30) Foreign Application Priority Data

Dec. 7, 2021 (EP) .................................... 21212889

(51) Int. Cl.
*G01K 1/022* (2021.01)
*G01D 9/00* (2006.01)
*G01K 1/024* (2021.01)

(52) U.S. Cl.
CPC ............ *G01D 9/007* (2021.05); *G01K 1/022* (2013.01); *G01K 1/024* (2013.01)

(58) Field of Classification Search
CPC ........ G01D 9/007; G01K 1/022; G01K 1/024; G01K 2207/04
(Continued)

(56) References Cited

U.S. PATENT DOCUMENTS

| | | | | |
|---|---|---|---|---|
| 2007/0227913 A1 | 10/2007 | Shoenfeld | | |
| 2010/0289669 A1* | 11/2010 | Saltzman | H04Q 9/00 | 340/870.17 |
| 2021/0025634 A1* | 1/2021 | Alexander | F25B 21/02 | |

FOREIGN PATENT DOCUMENTS

CN 107643815 A 1/2018

OTHER PUBLICATIONS

European Search Report from corresponding EP Application No. 21212889, May 13, 2022.
(Continued)

*Primary Examiner* — Peter J Macchiarolo
*Assistant Examiner* — Mireille S Sadate-Moualeu
(74) *Attorney, Agent, or Firm* — Workman Nydegger

(57) ABSTRACT

A wireless logger device and a method for improving heat transfer in such a logger device, such that the logger device is configured to measure at least one environmental parameter of a shipment while transporting the shipment from an origin location to a destination location and regularly communicate the measured environmental parameter to an external data processing device. The logger device includes a housing having an opening, at least one sensing device including a temperature sensor for measuring the environmental parameter including temperature within the housing, a communication module comprising a modem for communicating the at least one measured environmental parameter to an external data processing device, and a display screen configured to be placed in the opening of the housing,
(Continued)

wherein the display screen is positioned adjacent the modem and is in thermal contact with the modem.

15 Claims, 1 Drawing Sheet

(58) Field of Classification Search
USPC .......................................................... 374/141
See application file for complete search history.

(56) References Cited

OTHER PUBLICATIONS

International Search Report from corresponding PCT Application No. PCT/EP2022/084736, Mar. 7, 2023.

* cited by examiner

WIRELESS LOGGER DEVICE AND A METHOD OF IMPROVING HEAT TRANSFER FROM SUCH A LOGGER DEVICE

FIELD OF THE INVENTION

The present invention relates to a wireless logger device and a method of improving heat transfer from such a wireless logger device.

BACKGROUND OF THE INVENTION

With the expansion and growth of global sourcing in a supply chain, more prevalent interest has been placed on automatic electronic time and monitoring of environment related parameters to increase food and drug safety and improve food defense systems throughout all areas of production, processing, storage and transportation and operations. Food and drug require proper handling of environment related parameters such as temperature during transport to assure shelf quality, longevity, and safety.

Logger devices are electronic monitoring devices commonly used for these purposes, namely, to automatically monitor and record various environmental related parameters of a shipment throughout a supply chain, such as temperature, humidity, acceleration, and air pressure, over time. A recent example of importance of such logger devices is the temperature monitoring of the COVID-19 vaccines, which is a key critical monitoring parameter. It is thus of outmost importance that the temperature measurements measured in the logger devices are stable.

Some of the logger devices used today act as a real time monitoring device meaning that measured environmental related parameters such as temperature are sent to an external computer monitoring device, which may also be understood as a cloud-based system platform, on a regular basis. These logger devices have a modem that is temporarily activated, i.e. the logger device "wakes-up", to transmit these measured environmental related parameters via e.g. cellular networks such as 2G/3G/4G and potentially 5G. This temporal activation is the main heat causing agent within the logger device, and therefore during this transmission the temperature measurements within the logger device are less reliable due to the temporal temperature fluctuations.

SUMMARY OF THE INVENTION

It is an object of embodiments of the invention to provide an improved logger device where temperature measurements are more reliable.

In general, the invention preferably seeks to mitigate, alleviate, or eliminate one or more of the above-mentioned disadvantages of the prior art singly or in any combination. In particular, it may be seen as an object of embodiments of the present invention to provide a logger device and a method for improving heat transfer from such a logger device that solves the above-mentioned problems, or other problems.

To better address one or more of these concerns, in a first aspect of the invention a logger device is provided configured to measure at least one environmental parameter of a shipment while transporting the shipment from an origin location to a destination location and regularly communicate the measured at least one environmental parameter together with position data of the logger device to an external data processing device, comprising:

a housing having an opening, at least one sensing device including a temperature sensor for measuring the at least one environmental parameter including temperature within the housing, a communication module comprising a modem for communicating the at least one measured environmental parameter to an external data processing device, and a display screen configured to be placed in the opening, wherein the display screen is position adjacent and in thermal contact with the modem and is configured, in addition to display information on the screen, to conduct heat created within the housing from the modem to an outer side of the housing.

Due to the thermal conductivity between the display and the modem, the thermal mass on the modem, which is a primary heat source in the logger device when the modem is connected e.g. to a cellular network (2G/3G/4G or 5G), is increased. The thermal mass may be seen as at least the display screen, and/or the display screen together with the housing because of the thermal connection between the display and the housing, but this thermal connection between the display screen and the housing may be further improved with appropriate thermal agent when the display screen is mounted to the opening of the housing. The increase of the thermal mass enhances the heat absorbance from the modem and thus reduces heat fluctuations inside the logger device and thus makes the logger device much less dependent on whether the modem is turned on and is in wake-up mode (is in communication with external data processing device) or is turned off and is in low-power mode (is not in communication to the external data processing device) when temperature measurements take place. The display screen may thus be seen as a cooling agent for the logger device. It is as an example not uncommon that such temperature measurements take place every 10 minutes and that the wake-up mode where the logger device checks if there is a connection available is once every hour (or more seldom, e.g. depending on the type of transport), where in case a connection is available it sends the measured data including the temperature data together with the location of the logger device and the shipment. This kind of operation is often referred to as real-time monitoring. The location of the logger device may be determined with known methods, such as with triangulation with the cellular network that is available.

Moreover, having such a rigid support via the modem for the display gives the display extra strength and makes it less sensitive to e.g. external pressure onto the display.

Additionally, the increase in the thermal mass increases the operational temperature window of the logger device. As an example, the operational temperature for displays can be around or below 0° C. depending on type of display screens. Due to the heat transfer this temperature in the display is increased meaning that instead of e.g. the 0° C. the operation temperature may be several degrees below 0° C.

In one embodiment, the display screen comprises an electron ink (e-ink) display screen. Thus, an energy favorable solution is provided for displaying the measured environmental parameters from e.g. the at least one sensing device, such as the measured temperature, and/or humidity, and/or vibration or acceleration, the power state of the power source etc. As is well known to a person skilled in the art, such an e-ink display uses electronically charged ink to display graphics on the screen and only requires power when the screen is updated, compared to LCD/OLED displays that require the display to be constantly refreshed several times per seconds.

In one embodiment, the wireless logger device further comprises a thermally conductive material positioned between the modem and the display screen, where in an embodiment the thermally conductive material comprises double-sided thermal adhesive tape.

In a preferred embodiment, the geometrical dimension between the modem, the thermally conductive material and the display screen is such that when assembled the thermally conductive material is partially in a compressed state.

Utilizing such a thermally conductive tape enhances the thermal conductance from the modem towards the display screen and the remaining part of the logger housing which further improves the heat transfer from the modem to the surroundings. Also, using double-sided thermal adhesive tape, and applying such a compression on the thermally conductive material eliminates possible air pockets between the thermally conductive material and the modem/display and thus the thermal conductivity is maximized.

In an embodiment, the area of the display fully encloses the area of the modem. In another embodiment, the area of the display fully encloses the area of the modem and partially exceeds some parts of the modem. Thus, it is ensured that the whole heat formation from the surface of the modem is conducted away and out of the logger device.

In one embodiment, the logger device further comprises a cover glass that at least fully covers a display side facing outside of the housing. Thus, a surface protection is provided for the display screen.

In an embodiment, the logger device according to the present invention further comprises at least one processor, a memory for storing the measurement data measured by the at least one sensing device, and a rechargeable power source such as a rechargeable battery, where the at least one processor is amongst others configured to operate the power source, the battery and the memory, e.g. by optimizing the battery usage, keep the logger device in an optimal power mode, such as by transferring it temporarily from a low power mode to a higher energy mode when transferring data to the external data processing device, and then back to the low power mode.

Also, when a deviation is detected in the measurements by at least one sensing device, e.g. the temperature goes above a given threshold value, the processor instructs the modem to go from a low power mode to the higher energy mode to report this and transfer the data to the external processing device.

In one embodiment, the processor operates the power source by means of managing the communication module including turning-on the modem when it transmits at least some of the measurement data to the external data processing device and turning-off the modem when it is not transmitting measurement data.

Turning the modem off is moreover of particular relevance in maintaining power as long as possible, e.g. maintaining a battery charged as long as possible.

This way of managing the communication by turning-on and off the modem may improve shelf life which is important since the logger device typically may need to be shelved for weeks or months without losing most of the power.

In an embodiment, the display screen and the modem have two-dimensional surfaces and where the thermal contact between the display screen and the modem is through these two-dimensional surfaces. Thus, the thermal contact area is maximized and thus the thermal conductivity.

The logger device according to the present invention may also be understood as a real-time logger device because as already discussed it sends measurement data along with the position data on a regular basis, i.e. in real time, to the external data processing device, which may also be understood as a cloud-based system platform.

Also, the fact that the logger device uses preferably a rechargeable power source, the logger device is preferably a multiuse logger device.

The term shipment may according to the present invention be understood as food products, or medicine in a container, in a pallet, in a box, in a transport vehicle, in an aircraft etc.

In a second aspect of the invention, a method is provided for improving heat transfer from a wireless logger device, where the logger device is configured to measure at least one environmental parameter of a shipment while transporting the shipment from an origin location to a destination location and regularly communicate the measured at least one environmental parameter together with position data of the logger device to an external data processing device, where the logger device comprises:

- a housing having an opening,
- at least one sensing device including a temperature sensor for measuring the at least one environmental parameter including temperature within the housing,
- a communication module comprising a modem for communicating the at least one measured environmental parameter to an external data processing device, and
- a display screen configured to be placed in the opening of the housing, wherein the method comprises:

- placing the display screen adjacent the modem and in thermal contact with the modem such that the display screen is configured, in addition to display information on the screen, to conduct heat created within the housing from the modem to the outer side of the housing.

In an embodiment, the method further comprises adding a thermally conductive material between the modem and the display, this may include using double-sided thermal adhesive tape placed between the modem and the display. To further improve the thermal conductance and to eliminate air pockets between the thermally conductive tape and the modem and the display screen, the geometrical dimension between the modem, the thermally conductive material, and the display screen may be selected such that when assembled together the thermally conductive material is partially in a compressed state.

This display comprises in one embodiment an electron ink (e-ink) display screen and where the step of displaying information on the screen includes displaying temperature information indicating the temperature of the shipment on the screen with either fixed time interval and/or when measured temperature varies from a previous temperature.

The logger device according to the present invention is reusable, but a common lifetime of the logger device is 5-7 years, or even more.

The position data of the shipment is based on the position data of the logger device based on available cellular network e.g. using triangulation of cellular towers, and/or WiFi information, where the communication module may additionally comprise a so-called WIFI sniffer to acquire location data. Other types of communication modules may also be utilized to identify the position of the shipment, i.e. the data logger.

In a third aspect of the invention, a supply chain monitoring system is provided configured to monitor in real time environmental parameters of a shipment while transporting the shipment from an origin location to a destination location, where the system comprises:

an external data processing device, a wireless logger device, comprising:

a housing having an opening, at least one sensing device including a temperature sensor for measuring the at least one environmental parameter including temperature within the housing, a communication module comprising a modem for communicating the at least one measured environmental parameter together with position data of the logger device to the external data processing device, and a display screen configured to be placed in the opening of the housing, wherein the display screen is position adjacent the modem and is in thermal contact with the modem and is configured, in addition to display information on the screen, to conduct heat created within the housing from the modem to an outer side of the housing.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
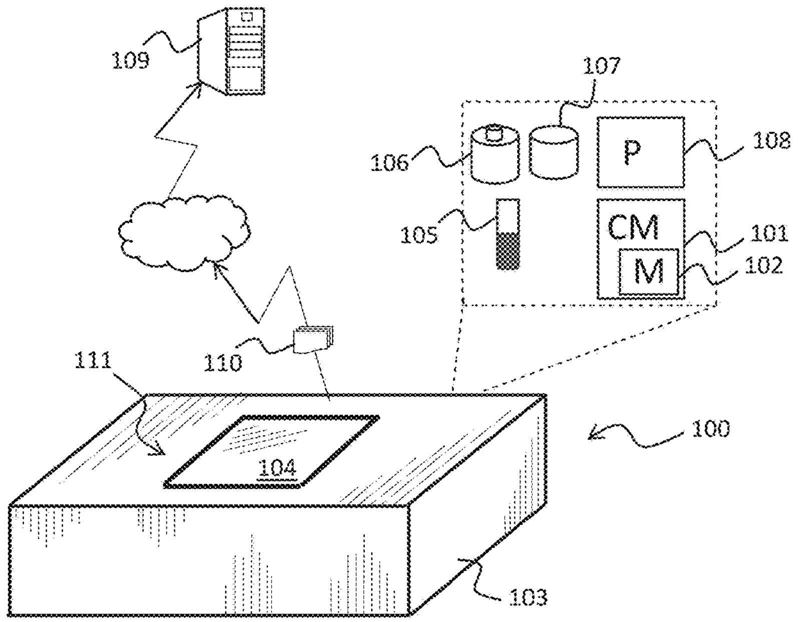
FIG. 1 shows an embodiment of a wireless logger device 100 according to the present invention configured to monitor at least one environmental parameter of a shipment.

FIG. 1 shows an embodiment of a wireless logger device 100 according to the present invention configured to monitor at least one environmental parameter of a shipment such as food products, beverages, and medicine.

The logger device 100 comprises a rechargeable power source 106 for powering the wireless logger device, at least one sensing device including a temperature sensor 105 for measuring the temperature of the shipment, at least one processor 108, a communication module 101 comprising a modem 102 that is operated by the processor 108, where the modem is configured to connect to a communication network and transmit the measured temperature data 110 regularly in real time to an external data processing device 109 along with the position data of the shipment, and a memory 107 for e.g. storing all measured data.

The logger device further comprises a housing 103 having an opening 111 therein, and a display 104, such as an electron ink (e-ink) display screen, which is positioned relative to the opening such that it fits therein.

The display screen 104 is position adjacent the modem 102 within the housing 103 where the display screen 104 is in thermal contact with the modem and is configured, in addition to display information on the screen, to conduct heat created within the housing from the modem to an outer side of the housing.

Figure 2:
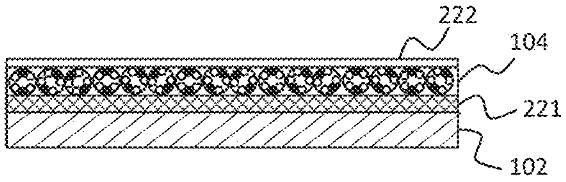
FIG. 2 shows a cross sectional view of the display screen shown in FIG. 1.

FIG. 2 shows a cross sectional view of the display screen 104 shown in FIG. 1 where the flat two-dimensional surface of the display is adjacent and in thermal contact with the two-dimensional surface of the modem 102, where to improve the thermal contact a thermally conductive material 221 is placed there between. To minimize possible air pockets between the display screen 104 and the modem 102, the thermally conductive material 221 is preferably double-sided thermal adhesive tape, where preferably the geometrical dimension between the modem 102, the thermally conductive material 221 and the display screen 104 is such that when assembled the thermally conductive material is partially in a compressed state.

As shown here, the area of the display fully enclosed the area of the modem, but the area of the display screen may additionally partially exceed some parts of the modem to improve the thermal conductivity further.

Shown is also an embodiment where a cover glass 222 is provided on top of the display to strengthen it and prevent it from being damaged.

Figure 3:
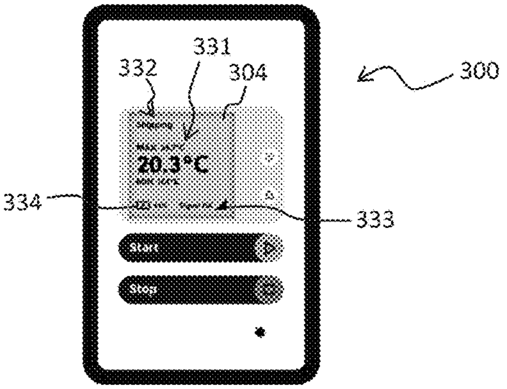
FIG. 3 shows an embodiment of a logger device according to the present invention.

FIG. 3 shows an embodiment of a logger device 300 according to the present invention illustrating graphically where the display screen is an e-ink screen 304, that is capable of illustrating various information on the e-ink display, such as, but not limited to, the shipment mode 332 in which the logger device is in, various temperature measurements 331 such as minimum and maximum temperatures and current temperature (or average temperature), the signal strength 333 and the battery status 334.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A wireless logger device configured to measure at least one environmental parameter of a shipment while transporting the shipment from an origin location to a destination location and regularly communicate the measured at least one environmental parameter together with position data of the logger device to an external data processing device, comprising:

a housing having an opening, at least one sensing device including a temperature sensor for measuring the at least one environmental parameter including temperature within the housing, a communication module comprising a modem for communicating the at least one measured environmental parameter to an external data processing device, and a display screen configured to be placed in the opening of the housing, wherein the display screen is positioned adjacent and in thermal contact with the modem and is configured, in addition to display information on the screen, to conduct heat created within the housing from the modem to an outer side of the housing.

2. The wireless logger device according to claim 1, where the display screen comprises an electron ink (e-ink) display screen.

3. The wireless logger device according to claim 1, further comprising a thermally conductive material positioned between the modem and the display screen.

4. The wireless logger device according to claim 3, wherein the thermally conductive material comprises double-sided thermal adhesive tape.

5. The wireless logger device according to claim 3, wherein the geometrical dimension between the modem, the thermally conductive material, and the display screen is such that when assembled together the thermally conductive material is partially in a compressed state.

6. The wireless logger device according to claim 1, wherein the area of the display screen fully encloses the area of the modem.

7. The wireless logger device according to claim 1, wherein the area of the display device fully encloses the area of the modem and partially exceeds some parts of the modem.

8. The wireless logger device according to claim 1, further comprising a cover material such as a glass which at least fully covers a display side of the display screen facing outside of the housing.

9. The wireless logger device according to claim 1, wherein the display screen and the modem have two-dimensional surfaces and where the thermal contact between the display screen and the modem is through these two-dimensional surfaces.

10. A method of improving heat transfer from a wireless logger device, where the logger device is configured to measure at least one environmental parameter of a shipment while transporting the shipment from an origin location to a destination location and regularly communicate the measured at least one environmental parameter together with position data of the logger device to an external data processing device, where the logger device comprises:

a housing having an opening, at least one sensing device including a temperature sensor for measuring the at least one environmental parameter including temperature within the housing, a communication module comprising a modem for communicating the at least one measured environmental parameter to an external data processing device, and a display screen configured to be placed in the opening of the housing, wherein the method comprises:

placing the display screen adjacent the modem and in thermal contact with the modem such that the display screen is configured, in addition to display information on the screen, to conduct heat created within the housing from the modem to the outer side of the housing.

11. The method according to claim 10, wherein the method further comprises adding a thermally conductive material between the modem and the display.

12. The method according to claim 10, further comprising using double-sided thermal adhesive tape placed between the modem and the display.

13. The method according to claim 10, further comprising having the geometrical dimension between the modem, the thermally conductive material, and the display screen such that when assembled together the thermally conductive material is partially in a compressed state.

14. The method according to claim 10, wherein the display comprises an electron ink (e-ink) display screen and where the step of displaying information on the screen includes displaying temperature information indicating the temperature of the shipment on the screen with either fixed time interval and/or when measured temperature varies from a previous temperature.

15. A supply chain monitoring system configured to monitor in real time environmental parameters of a shipment while transporting the shipment from an origin location to a destination location, where the system comprises:

an external data processing device, a wireless logger device, comprising:

a housing having an opening, at least one sensing device including a temperature sensor for measuring the at least one environmental parameter including temperature within the housing, a communication module comprising a modem for communicating the at least one measured environmental parameter together with position data of the logger device to the external data processing device, and a display screen configured to be placed in the opening of the housing, wherein the display screen is positioned adjacent the modem and is in thermal contact with the modem and is configured, in addition to display information on the screen, to conduct heat created within the housing from the modem to an outer side of the housing.

* * * * *